(12) United States Patent
Yamazaki

(10) Patent No.: US 9,296,279 B2
(45) Date of Patent: Mar. 29, 2016

(54) VEHICLE SUN VISOR

(71) Applicant: KYOWA SANGYO CO., LTD., Toyota-shi, Aichi (JP)

(72) Inventor: Kosuke Yamazaki, Okazaki (JP)

(73) Assignee: KYOWA SANGYO CO., LTD., Toyota-shi (JP)

( * ) Notice: Subject to any disclaimer, the term of this patent is extended or adjusted under 35 U.S.C. 154(b) by 0 days.

(21) Appl. No.: 14/663,929

(22) Filed: Mar. 20, 2015

(65) Prior Publication Data

US 2015/0273988 A1 Oct. 1, 2015

(30) Foreign Application Priority Data

Mar. 25, 2014 (JP) .................. 2014-062642

(51) Int. Cl.
*B60J 1/02* (2006.01)
*B60J 3/02* (2006.01)
*F16F 13/06* (2006.01)
*F16F 9/12* (2006.01)

(52) U.S. Cl.
CPC ................ *B60J 3/0278* (2013.01); *B60J 3/026* (2013.01); *B60J 3/0265* (2013.01); *F16F 9/12* (2013.01); *F16F 13/06* (2013.01); *F16F 2232/04* (2013.01)

(58) Field of Classification Search
CPC ........ B60J 3/0278; B60J 3/026; B60J 3/0265; B60J 3/0239; F16F 13/06
USPC .............................................. 296/97.13, 97.9
See application file for complete search history.

(56) References Cited

U.S. PATENT DOCUMENTS

| 4,909,562 | A   | * | 3/1990  | Sakuma et al. ............... 296/97.5 |
| 5,139,303 | A   | * | 8/1992  | Miller ........................... 296/97.9 |
| 6,264,264 | B1  | * | 7/2001  | Kato et al. .................. 296/97.12 |
| 6,264,480 | B1  |   | 7/2001  | Nealis et al. |
| 8,602,480 | B2  | * | 12/2013 | Kim ....................... B60J 3/0265 296/97.13 |
| 2009/0160208 | A1 | * | 6/2009 | Sturt et al. .................... 296/97.9 |
| 2012/0175204 | A1 | * | 7/2012 | Arnold et al. ................. 188/271 |
| 2013/0320698 | A1 | * | 12/2013 | Asai ....................... B60J 3/0265 296/97.1 |

FOREIGN PATENT DOCUMENTS

JP 2002-012028 A 1/2002

* cited by examiner

*Primary Examiner* — Pinel Romain
(74) *Attorney, Agent, or Firm* — Oliff PLC

(57) ABSTRACT

A vehicle sun visor includes a support shaft; a sun visor body; an urging member that applies an urging force to the sun visor body; a damper that applies a damping force to rotational movement of the sun visor body when the sun visor body rotates to a stored position; and a damper operating portion that operates the damper. The damper operating portion includes a first operation element that rotates in conjunction with the sun visor body; a second operation element that converts rotational movement of the first operation element to linear movement; and a third operation element that is moved linearly via the second operation element. The damper is configured to be operated by linear movement of the third operation element in a prescribed range set between a use range and the stored position, when the sun visor body rotates to the stored position.

11 Claims, 8 Drawing Sheets

VEHICLE SUN VISOR

INCORPORATION BY REFERENCE

The disclosure of Japanese Patent Application No. 2014-062642 filed on Mar. 25, 2014 including the specification, drawings and abstract is incorporated herein by reference in its entirety.

BACKGROUND OF THE INVENTION

1. Field of the Invention

The invention relates to a vehicle sun visor including a damper that prevents generation of hitting noise that is generated if a sun visor body hits a ceiling surface of a vehicle cabin when the sun visor body is rotated to a stored position at which the sun visor body is disposed along the ceiling surface of the vehicle cabin.

2. Description of the Related Art

Conventionally, a vehicle sun visor described in Japanese Patent Application Publication No. 2002-12028 (JP 2002-12028 A) has been known. The vehicle sun visor described in JP 2002-12028 A includes a support shaft fitted to a ceiling surface of a vehicle cabin; a sun visor body that is rotatable about a longitudinal axis of the support shaft between a stored position at which the sun visor body is disposed along the ceiling surface of the vehicle cabin and a use range where the sun visor body is able to block light; and a damper that prevents generation of hitting noise that is generated if the sun visor body hits the ceiling surface of the vehicle cabin when the sun visor body is rotated to the stored position. The damper damps rotational movement of the sun visor body using resistance of a fluid.

The damper used in the vehicle sun visor in related art is configured to generate a damping force for constantly damping the rotational movement of the sun visor body. Therefore, the rotational movement is influenced by the damping force of the damper even when the sun visor body rotates to a desired light blocking position. Thus, operability (usability) of the vehicle sun visor is degraded.

SUMMARY OF THE INVENTION

The invention improves operability of a vehicle sun visor including a damper.

A vehicle sun visor according to an aspect of the invention includes a support shaft fitted to a ceiling surface of a vehicle cabin; a sun visor body that is rotatable about a longitudinal axis of the support shaft between a stored position and a use range; an urging member for applying an urging force to the sun visor body; a damper that applies a damping force to rotational movement of the sun visor body when the sun visor body rotates to the stored position; and a damper operating portion that operates the damper. The support shaft is typically fitted to the ceiling surface of the vehicle cabin via a fitting bracket. The urging member is typically an urging member that generates the urging force for rotating the sun visor body in a direction toward the stored position when the sun visor body is present between the stored position and a storage starting position that is separated from the stored position by a predetermined angle (a storing angle). The damper is typically a damper that generates the damping force using an increase in fluid pressure caused by pressing (compressing) a fluid for damping such as oil. The damper operating portion includes a first operation element that rotates in conjunction with the sun visor body; a second operation element that converts rotational movement of the first operation element to linear movement; and a third operation element that is moved linearly via the second operation element. As the first to third operation elements, elements with various configurations that can achieve functions of the first to third operation elements can be used. In addition, the first to third operation elements can be configured as separate bodies, or a plurality of operation elements among the first to third operation elements can be integrated with each other. In the above-described aspect of the invention, the damper is configured to be operated by linear movement of the third operation element in a prescribed range set between the use range and the stored position, when the sun visor body rotates to the stored position. The prescribed range may include a part of the use range. In the above-described aspect of the invention, the damper is configured to be operated in the prescribed range set between the stored position and the use range. Thus, it is possible to improve operability of the sun visor body during rotational movement other the rotational movement to the stored position.

In the above-described aspect of the invention, the damper may include a fluid for damping, a housing that has a space portion in which the fluid for damping is housed in a sealed manner, and a damper piston that is disposed in the space portion and presses the fluid for damping; and the damper piston may operate as the third operation element in the damper operating portion. In the aspect, the damper generates the damping force using the increase in the fluid pressure caused by pressing the fluid. Thus, the damper can easily be configured. In addition, the damper piston of the damper operates as the third operation element in the damper operating portion. Thus, the number of components can be reduced.

In the above-described aspect of the invention, the space portion may be divided into a plurality of space regions by the damper piston, and a communication passage, which provides communication among the plurality of space regions, may be provided to allow the fluid for damping to flow among the plurality of space regions. The communication passage may be formed, for example, in the damper piston, or between the damper piston and the housing. In the aspect, the characteristic of the damper can be changed by adjusting the shape of the communication passage.

In the above-described aspect of the invention, the damper operating portion may further include an elastic member that applies an elastic force in a returning direction, to the damper piston as the third operation element. In this aspect, when the sun visor body does not rotate to the stored position, the damper piston is urged in the returning direction by the elastic force of the elastic member. Thus, the operability of the sun visor body can further be improved.

In the above-described aspect of the invention, it is possible to improve the operability of the vehicle sun visor including the damper.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
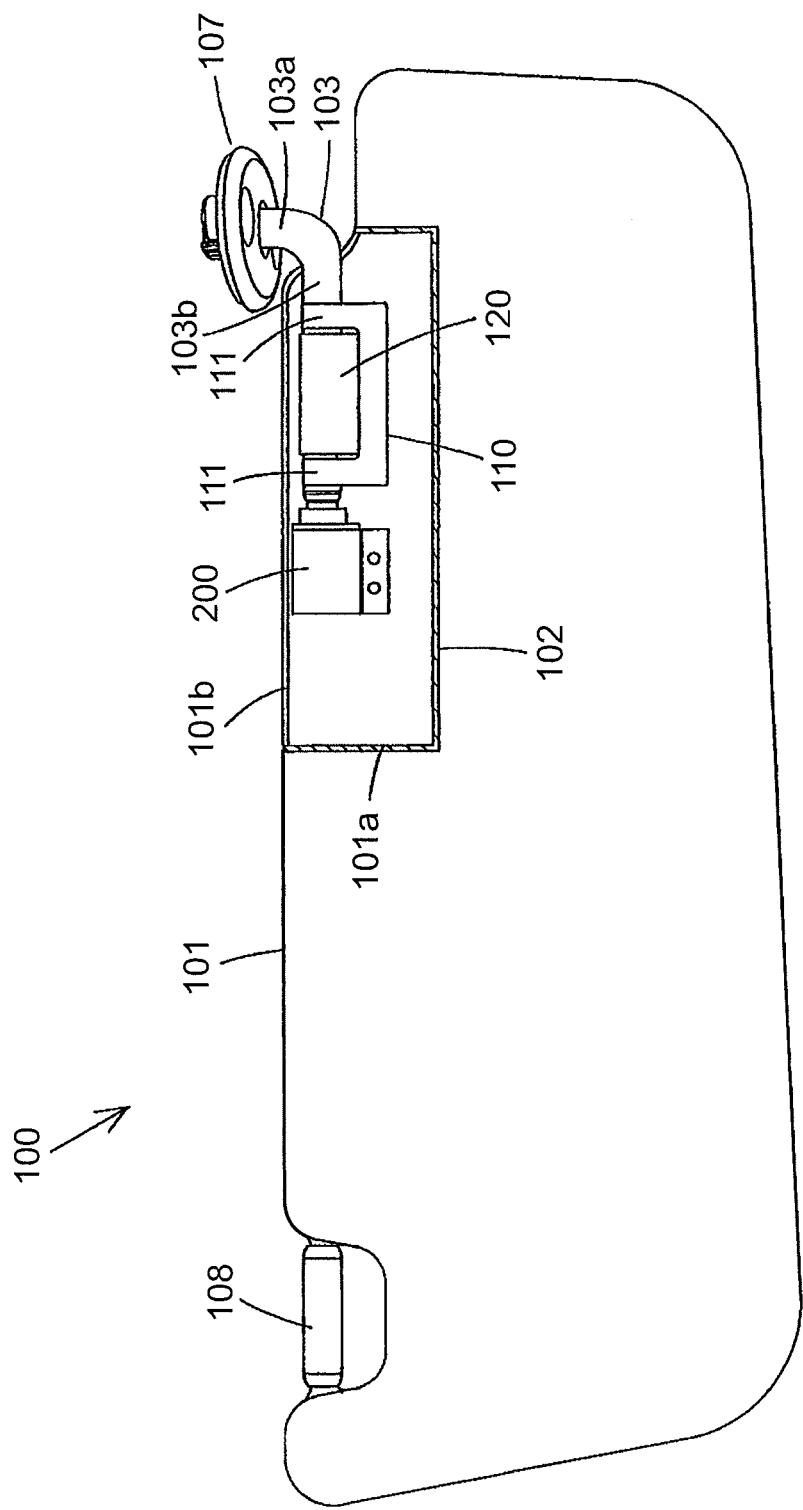
FIG. 1 is a partially broken front view of a vehicle sun visor according to a first embodiment of the invention.

Hereinafter, a vehicle sun visor according to a first embodiment of the invention will be described with reference to FIG. 1 to FIG. 7. FIG. 1 illustrates a partially broken front view of a vehicle sun visor 100 according to the embodiment. FIG. 1 shows a state in which a sun visor body 101 that constitutes the vehicle sun visor 100 is disposed on a windshield side and to extend in a substantially vertical direction with respect to a ceiling surface of a vehicle cabin. The vehicle sun visor 100 according to the embodiment includes the sun visor body 101 in the form of a plate, a fitting bracket 107 used to fit the sun visor body 101 to a vehicle, and a support shaft 103. The support shaft 103 has a circular cross section and is formed to have a substantially L shape constituted by a vertical shaft portion 103a that extends in the substantially vertical direction and a horizontal shaft portion 103b that extends in a substantially horizontal direction. The vertical shaft portion 103a is rotatably fitted to the ceiling surface of the vehicle cabin via the fitting bracket 107.

Figure 5:
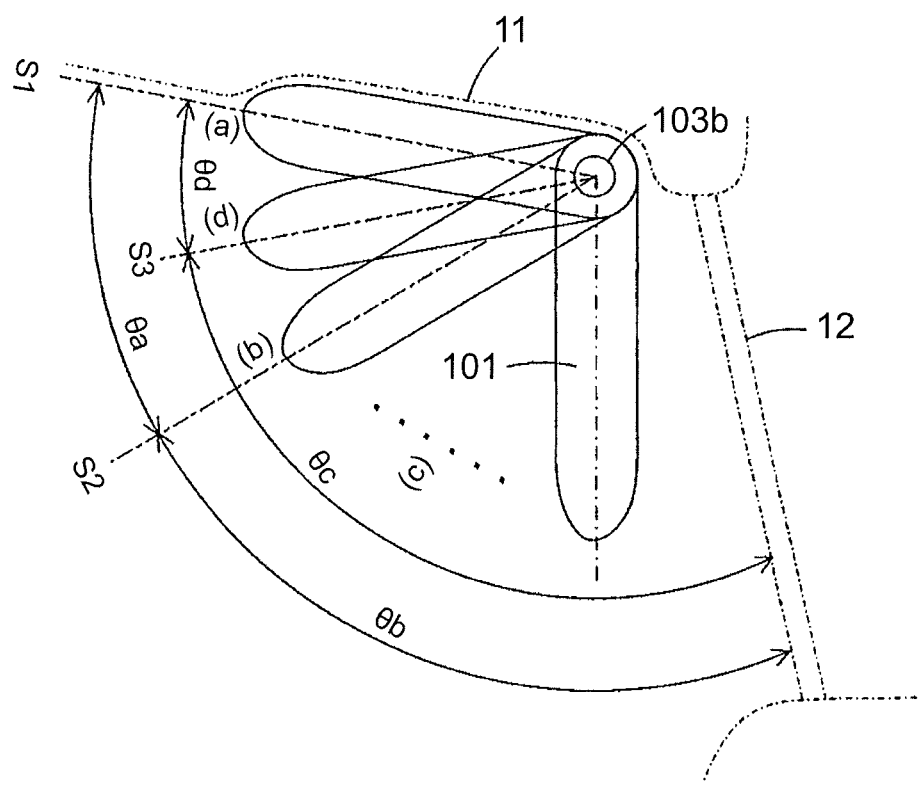
FIG. 5 is a view for illustrating an operation range of the damper mechanism used in the vehicle sun visor according to the first embodiment of the invention.

As shown in FIG. 5, by rotating the sun visor body 101 about a longitudinal axis of the horizontal shaft portion 103b of the support shaft 103, a rotational position of the sun visor body 101 can be changed between a stored position (a) where the sun visor body 101 is disposed along a ceiling surface 11 of the vehicle cabin and a use range (a light blocking range) (c) where the sun visor body 101 can block light entering through a windshield 12.

The sun visor body 101 includes a supporting shaft 108 disposed on a side opposite to the support shaft 103. This supporting shaft 108 can be held by a hook (not shown) that is fitted to an interior side of the ceiling surface of the vehicle cabin. The supporting shaft 108 is held by the hook so that the position of the sun visor body 101 can be changed stably from the stored position to the use range or from the use range to the stored position.

As shown in FIG. 1, the sun visor body 101 is configured to have a hollow inner space by joining a first half-split body 101a and a second half-split body 101b, which are constituent elements of the body, such that the first half-split body 101a and the second half-split body 101b face each other, and an outer surface thereof is covered with a cover 102. As shown in FIG. 1, a bearing member 110 including right and left bearing portions 111 that allow the sun visor body 101 to rotate with respect to the horizontal shaft portion 103b, an urging member 120, and a damper mechanism 200 are provided in the hollow portion of the sun visor body 101. The horizontal shaft portion 103b is rotatably inserted through a through hole of each of the right and left bearing portions 111.

The urging member 120 generates an urging force for urging the sun visor body 101 in a direction toward the stored position when a rotational angle of the sun visor body 101 from the stored position is equal to or smaller than a storing angle (i.e., the sun visor body 101 is in a storing range). On the other hand, when the rotational angle of the sun visor body 101 from the stored position is in a range larger than the storing angle (i.e., the sun visor body 101 is in the use range), the urging member 120 generates a holding force for holding the sun visor body 101 at a rotation stop position.

The operation of the urging member 120 will be described with reference to FIG. 5. FIG. 5 is a view of the sun visor body 101 seen in a longitudinal direction of the horizontal shaft portion 103b. A position (a) shown in FIG. 5 is a stored position S1 at which the sun visor body 101 is disposed along the ceiling surface 11 of the vehicle cabin. A position (b) shown in FIG. 5 is a storage starting position S2 at which the urging member 120 starts generating the urging force to urge the sun visor body 101 in a direction toward the stored position S1. A position (c) shown in FIG. 5 is a use position (the use range) of the sun visor body 101 between the storage starting position S2 at which the generation of the urging force is started, and a position at which the sun visor body 101 is disposed along the windshield 12. An angle θb of the use range is appropriately set. An angle θc is an angle obtained by adding an angle from the storage starting position S2 to a damping starting position S3 (described later), to the angle θb of the use range. In the case where the sun visor body 101 is present in a range between the stored position S1 and the storage starting position S2 to which the sun visor body 101 rotates by a storing angle θa from the stored position S1 toward the use range (i.e., in the case where a rotational angle θ from the stored position S1 is equal to or smaller than the storing angle θa), the urging member 120 generates the urging force for rotating the sun visor body 101 in the direction toward the stored position S1. On the other hand, in the case where the sun visor body 101 has moved beyond the storage starting position S2 and is present in the use range (i.e., in the case where the rotational angle θ from the stored position S1 is larger than the storing angle θa), the urging member 120 generates the holding force for holding the sun visor body 101 at the rotation stop position. A direction in which the sun visor body 101 rotates from the stored position S1 toward the use range is referred to as a "counter-storing direction", and a direction in which the sun visor body 101 rotates from the use range toward the stored position S1 is referred to as a "storing direction", with the horizontal shaft portion 103b being the rotational center. In the embodiment, an urging member referred to as a clip is used as the urging member 120. More specifically, the horizontal shaft portion 103b is formed to have a cross-sectional shape that is constituted by a linear part in which a part of a circle is cut out, and a remaining arc part. Then, a plate spring is provided to hold the portion of the horizontal shaft portion 103b where the arc part and the linear part are formed, from a radially outer side. This plate spring is referred to as the "clip".

Figure 2:
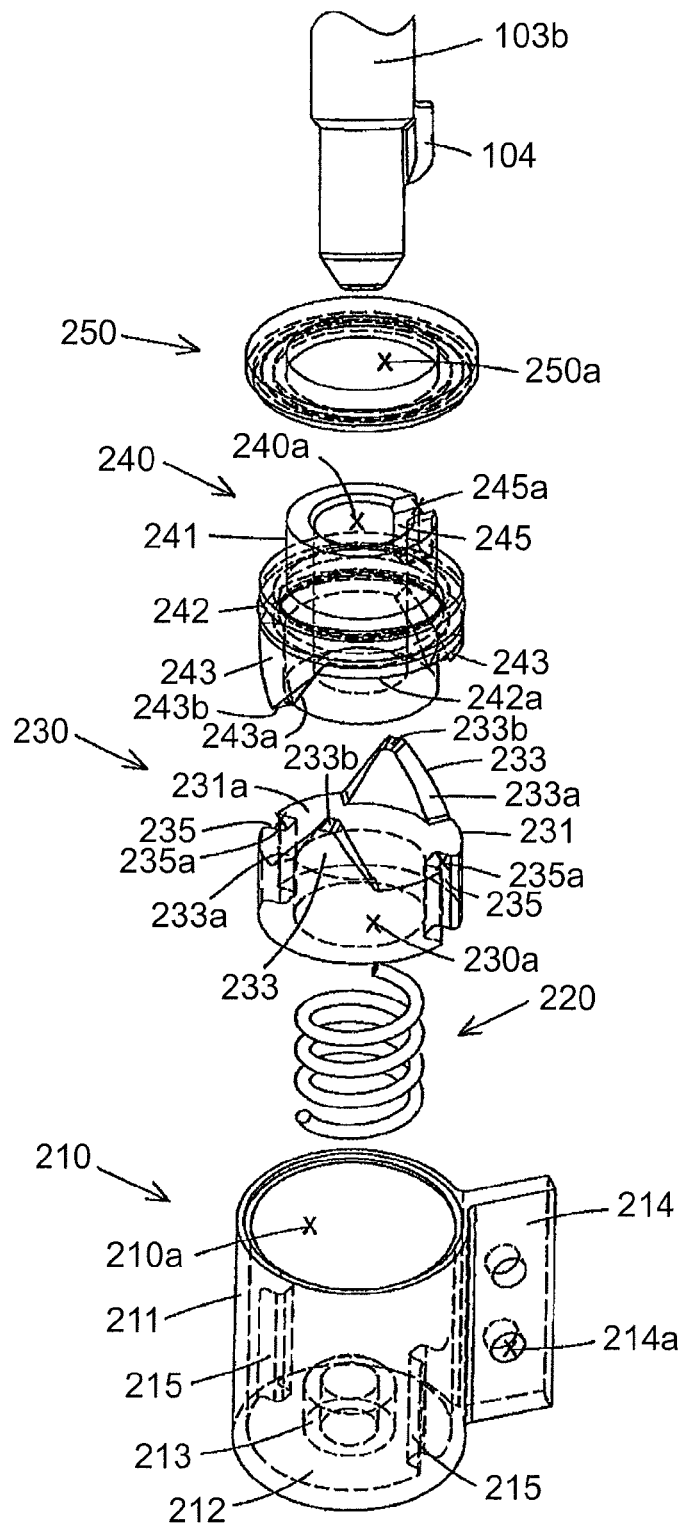
FIG. 2 is an exploded perspective view of a damper mechanism used in the vehicle sun visor according to the first embodiment of the invention.
Figure 3:
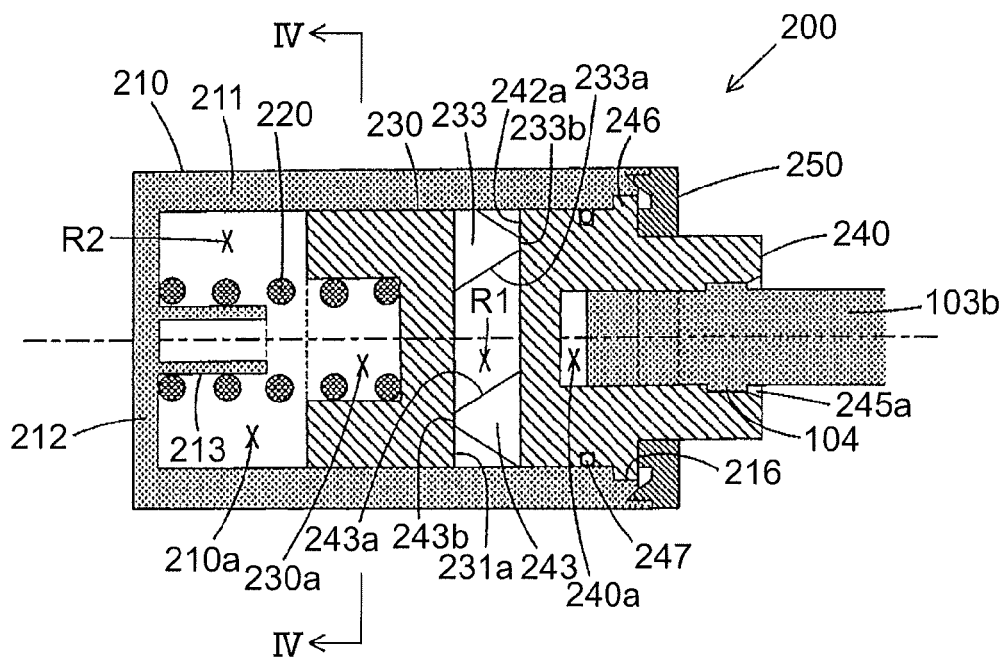
FIG. 3 is a schematic sectional view of the damper mechanism used in the vehicle sun visor according to the first embodiment of the invention, taken along an axial direction.
Figure 4:
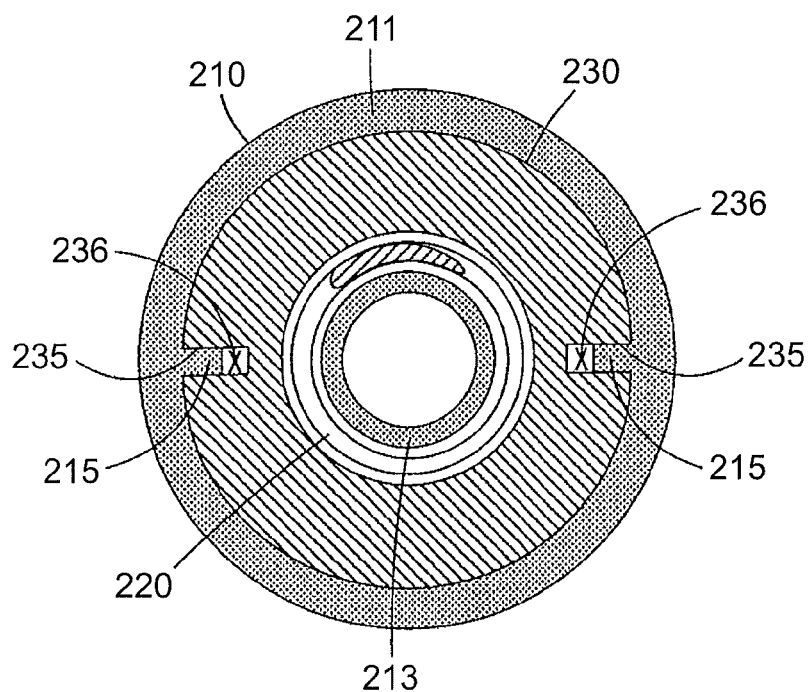
FIG. 4 is a sectional view taken along a line IV-IV in FIG. 3 and seen along arrows in FIG. 3.

Next, a configuration of the damper mechanism 200 will be described with reference to FIG. 2 to FIG. 4. FIG. 2 is an exploded perspective view of the damper mechanism 200. FIG. 2 shows a housing 210, a coil spring 220, a piston 230, a piston operating member 240, and a lid member 250 that constitute the damper mechanism 200 as well as the horizontal shaft portion 103b that is joined to the damper mechanism 200. FIG. 3 is a schematic sectional view of the damper mechanism 200 taken along an axial direction. FIG. 3 shows the damper mechanism 200 in which the coil spring 220, the piston 230, and the piston operating member 240 are disposed in a space portion 210a of the housing 210, the lid member 250 is welded to the housing 210, and the horizontal shaft portion 103b is joined to the piston operating member 240. FIG. 4 is a sectional view taken along a line IV-IV in FIG. 3 and seen along arrows in FIG. 3. FIG. 4 shows a state in which the piston 230 is disposed in the space portion 210a of the housing 210 and each of communication passages 236 is formed by a projected portion 215 that is formed on an inner peripheral surface of an outer wall portion 211 of the housing 210 and a groove 235a that is formed on an outer peripheral surface of the piston 230. In the embodiment, the housing 210, the coil spring 220, the piston 230, and the lid member 250 are provided to be rotatable together with the sun visor body 101 about the longitudinal axis of the horizontal shaft portion 103b. The piston 230 corresponds to a "damper piston" according to the invention.

As shown in FIG. 2, the housing 210 includes the cylindrical outer wall portion 211, a bottom portion 212, and a fitting portion 214. The space portion 210a with a circular cross section is formed by the outer wall portion 211 and the bottom portion 212. The space portion 210a extends in the longitudinal direction of the horizontal shaft portion 103b, and the vertical shaft portion 103a-side of the space portion 210a is opened. In the space portion 210a, a cylindrical inner wall portion 213 that extends in the longitudinal direction of the horizontal shaft portion 103b is formed at a center portion of the bottom portion 212. The projected portions 215 are formed at positions facing each other in the inner peripheral surface of the outer wall portion 211 such that the projected portions 215 extend in the longitudinal direction of the horizontal shaft portion 103b. Furthermore, in the embodiment, the housing 210 is fixed to the sun visor body 101. In the embodiment, the housing 210 is fixed to the sun visor body 101 using a fixing member such as a screw that is inserted in a fitting hole 214a formed in the fitting portion 214 of the housing 210. As shown in FIG. 3, the housing 210 is provided with a positioning portion 216 that is able to be engaged with a positioning portion 246 of the piston operating member 240 which will be described below.

As shown in FIG. 3, the coil spring 220, the piston 230, and the piston operating member 240 are disposed in the stated order, in the space portion 210a. The piston 230 is disposed such that the piston 230 is able to move linearly in the longitudinal direction of the horizontal shaft portion 103b within the space portion 210a. One end portion of the coil spring 220 is disposed between the cylindrical outer wall portion 211 and the cylindrical inner wall portion 213 that is formed at the center portion of the bottom portion 212. The other end portion of the coil spring 220 is disposed in a recessed portion 230a of the piston 230.

The piston 230 includes a cylindrical body portion 231. An outer peripheral surface of the cylindrical body portion 231 is formed to have the same shape as the shape of the inner peripheral surface of the outer wall portion 211 of the housing 210. The cylindrical body portion 231 is provided with the recessed portion 230a which has a circular cross section, and in which the other end portion of the coil spring 220 is inserted. Thus, an elastic force of the coil spring 220 acts as a force that moves the piston 230 linearly toward the piston operating member 240. The coil spring 220 corresponds to an "elastic member" according to the invention. A direction in which the piston 230 moves toward the piston operating member 240 corresponds to a "returning direction of linear movement" according to the invention. As shown in FIG. 4, the grooves 235a are formed by groove forming surfaces 235 at the positions facing each other in a circumferential direction in the outer peripheral surface of the body portion 231 of the piston 230. Each of the grooves 235a is recessed from the outer peripheral surface of the body portion 231 toward the center in the radial direction, and extends in the longitudinal direction of the horizontal shaft portion 103b. The projected portions 215 of the housing 210 are respectively inserted in the grooves 235a of the body portion 231 of the piston 230. Accordingly, the linear movement of the piston 230 in the longitudinal direction of the horizontal shaft portion 103b is guided. Furthermore, the grooves 235a and the projected portions 215, which extend in the longitudinal direction of the horizontal shaft portion 103b, are fitted to each other. Thus, when the housing 210 rotates together with the sun visor body 101 about the longitudinal axis of the horizontal shaft portion 103b, the piston 230 also rotates together with the housing 210.

As it will be described below, communication passages that provide communication between a first space region R1 and a second space region R2 are provided such that a fluid is able to flow between the first space region R1 and the second space region R2 that are separated by the piston 230. In the embodiment, as shown in FIG. 4, a length of each groove 235a of the piston 230 in the radial direction is set to be longer than a length of the corresponding projected portion 215 of the housing 210 in the radial direction such that the communication passage 236 that provides communication between the first space region R1 and the second space region R2 is formed in the groove 235a.

First cam members 233 that extend in the circumferential direction of the body portion 231 and are projected toward the piston operating member 240 are formed in an end surface 231a of the body portion 231 of the piston 230 on a side that faces the piston operating member 240. In the embodiment, when seen in a direction that crosses the longitudinal direction of the horizontal shaft portion 103b, the first cam members 233 are formed at two positions that face each other in the circumferential direction of the body portion 231. Each of the first cam members 233 includes a contact portion 233a disposed on a storing direction side (i.e., on a forward side in the storing direction of the sun visor body 101) with the horizontal shaft portion 103b being the rotational center. The contact portion 233a is an inclined surface formed such that a distance from the end surface 231a is longer at a position on a counter-storing direction-side (i.e., on a forward side in the counter-storing direction) than at a position on a storing direction-side (i.e., on a forward side in the storing direction) along the circumferential direction. A tip 233b is formed at an end of the contact portion 233a on the counter-storing direction-side (i.e., on the forward side in the counter-storing direction) in the circumferential direction.

The piston operating member 240 includes a cylindrical body portion 241. The cylindrical body portion 241 is provided with a recessed portion 240a that is opened such that the horizontal shaft portion 103b is able to be inserted in the recessed portion 240a. A rotation prevention groove 245a is formed in the body portion 241 by a groove forming portion 245 and is fitted to a rotation prevention projection 104 provided in the horizontal shaft portion 103b. As shown in FIG. 3, the horizontal shaft portion 103b is inserted in the recessed portion 240a. At this time, the rotation prevention projection 104 that is provided on an outer periphery of the horizontal shaft portion 103b is inserted in the rotation prevention groove 245a of the piston operating member 240. Thus, the piston operating member 240 is joined to the horizontal shaft portion 103b. In other words, when the sun visor body 101 rotates about the longitudinal axis of the horizontal shaft portion 103b, the piston operating member 240 is maintained in a state in which the piston operating member 240 is joined to the horizontal shaft portion 103b, and thus the piston operating member 240 does not rotate.

A flange portion 242 is formed in the piston 230-side of the body portion 241 of the piston operating member 240. An outer peripheral surface of the flange portion 242 is formed to have the same shape as the shape of the inner peripheral surface of the outer wall portion 211 of the housing 210. The space portion 210a of the housing 210 is sealed by the flange portion 242 that is formed in the piston operating member 240. In other words, the sealed space portion 210a is defined by the piston operating member 240. A fluid such as oil is filled in the space portion 210a. The fluid, such as oil, which is filled in the space portion 210a of the housing 210 corresponds to a "fluid for damping" of the invention. As shown in FIG. 3, the flange portion 242 of the piston operating member 240 is provided with an annular seal member 247 that prevents leakage of the fluid filled in the space portion 210a via a gap between the outer wall portion 211 of the housing 210 and the flange portion 242 of the piston operating member 240. The piston operating member 240 is provided with the positioning portion 246 that is able to be engaged with the positioning portion 216 formed in the outer wall portion 211 of the housing 210. In the embodiment, a positioning projection is used as the positioning portion 246 of the piston operating member 240, and a positioning recessed portion is used as the positioning portion 216 of the housing 210. A position of the piston operating member 240 in the longitudinal direction of the horizontal shaft portion 103b with respect to the housing 210 is defined when the positioning portion 246 of the piston operating member 240 is engaged with the positioning portion 216 of the housing 210.

Furthermore, the piston operating member 240 is provided with second cam members 243 in an end surface 242a on a side that faces the piston 230, the second cam members 243 extending in a circumferential direction of the flange portion 242 and being projected toward the piston 230. In the embodiment, when seen in the direction that crosses the longitudinal direction of the horizontal shaft portion 103b, the second cam members 243 are formed at two positions that face each other in the circumferential direction of the flange portion 242. Each of the second cam members 243 includes a contact portion 243a disposed on the counter-storing direction-side (i.e., a forward side in the counter-storing direction of the sun visor body 101) with the horizontal shaft portion 103b being the rotational center. The contact portion 243a is an inclined surface formed such that a distance from the end surface 242a is longer at a position on the storing direction-side (i.e., on a forward side in the storing direction) than at a position on the counter-storing direction-side (i.e., on a forward side in the counter-storing direction) in the circumferential direction. A tip 243b is formed at an end of the contact portion 243a on the storing direction-side (i.e., on the forward side in the storing direction) in the circumferential direction.

In the embodiment, when the contact portion 233a of the first cam member 233 of the piston 230, which rotates together with the sun visor body 101, contacts the contact portion 243a of the second cam member 243 of the piston operating member 240 joined to the horizontal shaft portion 103b, a force that presses the piston 230 against the elastic force of the coil spring 220 acts.

In the embodiment, as shown in FIG. 3, when the contact portion 233a of the first cam member 233 of the piston 230 does not contact the contact portion 243a of the second cam member 243 of the piston operating member 240, the tip 243b of the second cam member 243 of the piston operating member 240 contacts the end surface 231a of the piston 230. In this state, the piston 230 rotates together with the sun visor body 101 about the longitudinal axis of the horizontal shaft portion 103b. Alternatively, in a state in which the tip 233b of the first cam member 233 of the piston 230 contacts the end surface 242a of the piston operating member 240, the piston 230 rotates together with the sun visor body 101 about the longitudinal axis of the horizontal shaft portion 103b. In this case, the force that presses the piston 230 against the elastic force of the coil spring 220 is not applied to the piston 230. Accordingly, the sun visor body 101 is able to rotate about the longitudinal axis of the horizontal shaft portion 103b without receiving a damping force from the damper mechanism 200.

The lid member 250 is provided with a circular through hole 250a. As shown in FIG. 2, the lid member 250 is fitted to the outer wall portion 211 of the housing 210 in a state in which the body portion 241 of the piston operating member 240 extends through the through hole 250a.

A "damper" according to the invention includes the housing 210, the piston 230, and the piston operating member 240. A "damper operating portion" according to the invention includes the piston 230, the piston operating member 240, and the elastic member (coil spring) 220. The piston 230 corresponds to a "first operation element" and a "third operation element" according to the invention. A "second operation element" according to the invention includes the first cam member 233 of the piston 230 and the second cam member 243 of the piston operating member 240.

Figure 6:
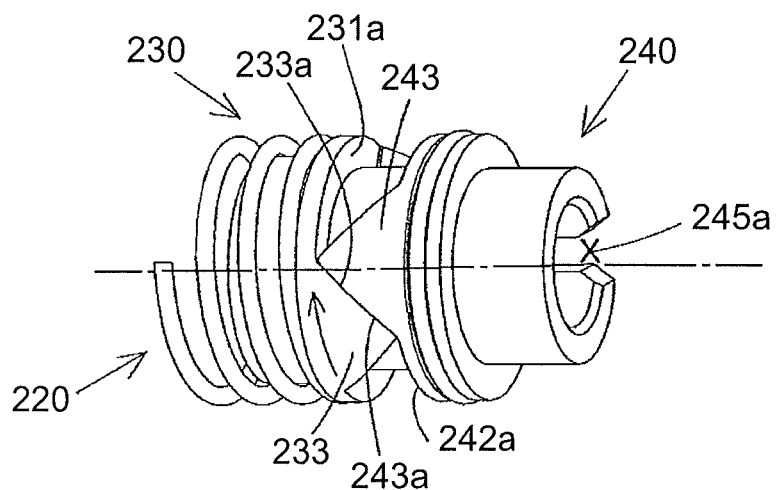
FIG. 6 is a view for illustrating a state of the damper mechanism used in the vehicle sun visor according to the first embodiment of the invention before a sun visor body is stored.
Figure 7:
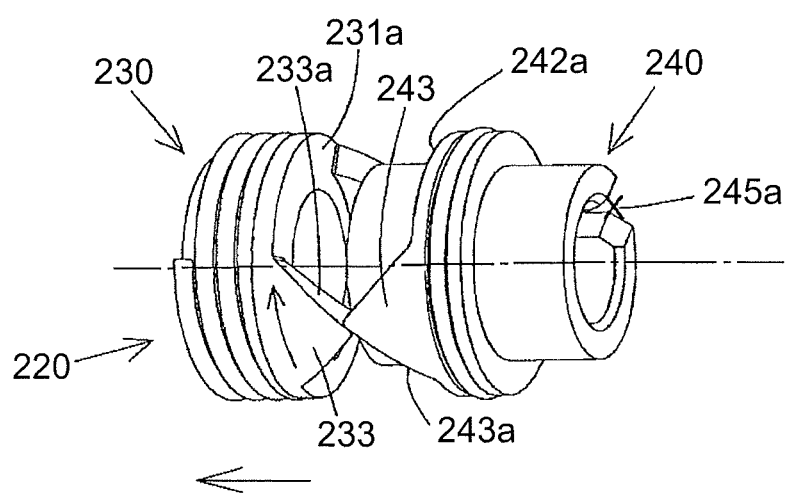
FIG. 7 is a view for illustrating a state of the damper mechanism used in the sun visor according to the first embodiment of the invention when the sun visor body is rotated to be stored.

The operation of the damper mechanism 200 will be described with reference to FIG. 5 to FIG. 7. The position (d) shown in FIG. 5 is the damping starting position S3 at which a damping operation performed by the damper mechanism 200 is started. In the embodiment, a damping angle θd between the stored position S1 and the damping starting position S3 is set to be equal to or smaller than the storing angle θa between the stored position S1 and the storage starting position S2 (θd≤θa). In the case where the sun visor body 101 rotates in the direction toward the stored position S1 (the storing direction) and the rotational angle θ of the sun visor body 101 from the stored position S1 becomes equal to or smaller than the storing angle θa (θ≤θa), the sun visor body 101 receives the urging force that rotates the sun visor body 101 in the direction toward the stored position S1, from the urging member 120, as described above. In the case where the sun visor body 101 further rotates in the direction toward the stored position S1 and the rotational angle θ of the sun visor body 101 from the stored position S1 becomes equal to or smaller than the damping angle θd (θ≤θd), the contact portion 233a of the first cam member 233 of the piston 230 and the contact portion 243a of the second cam member 243 of the piston operating member 240 start contacting each other, as shown in FIG. 6. A range in which the rotational angle θ of the sun visor body 101 from the stored position S1 is equal to or smaller than the damping angle θd corresponds to a "prescribed range" according to the invention. When the sun visor body 101 further rotates in the direction toward the stored position S1, the piston 230 receives the pressing force that presses the piston 230 against the elastic force of the coil spring 220, due to the contact between the contact portion 233a of the first cam member 233 of the piston 230 and the contact portion 243a of the second cam member 243 of the piston operating member 240, as shown in FIG. 7. In other words, the piston 230 receives the pressing force in a direction such that the first cam member 233 moves away from the second cam member 243 in the longitudinal direction of the horizontal shaft portion 103b. Accordingly, the piston 230 moves in the direction away from the piston operating member 240. Due to the movement of the piston 230 in the direction away from the piston operating member 240, the fluid in the second space region R2 is pressed (compressed). At this time, the fluid filled in the second space region R2 moves to the first space region R1 via the communication passages 236. Thus, the rotational movement of the sun visor body 101 in the direction toward the stored position S1 is damped. Thus, it is possible to prevent generation of hitting noise that is generated if the sun visor body 101 hits the ceiling surface of the vehicle cabin. When the sun visor body 101 rotates from the stored position S1 toward the use range (in the counter-storing direction), the piston 230 rotates in the counter-storing direction in a state in which the contact portion 233a of the first cam member 233 of the piston 230 contacts the contact portion 243a of the second cam member 243 of the piston operating member 240. At this time, the elastic force of the coil spring 220 acts in a direction to bring the piston 230 toward the piston operating member 240. In addition, at this time, the piston 230 does not receive the pressing force against the elastic force of the coil spring 220. Accordingly, the sun visor body 101 is not subject to the damping force provided by the damper mechanism 200 when rotating in the counter-storing direction. In addition, the sun visor body 101 is not subject to the damping operation performed by the damper mechanism 200 in the case where the sun visor body 101 is present in a range in which the rotational angle θ of the sun visor body 101 from the stored position S1 is larger than the damping angle θd (θ>θd).

Figure 8:
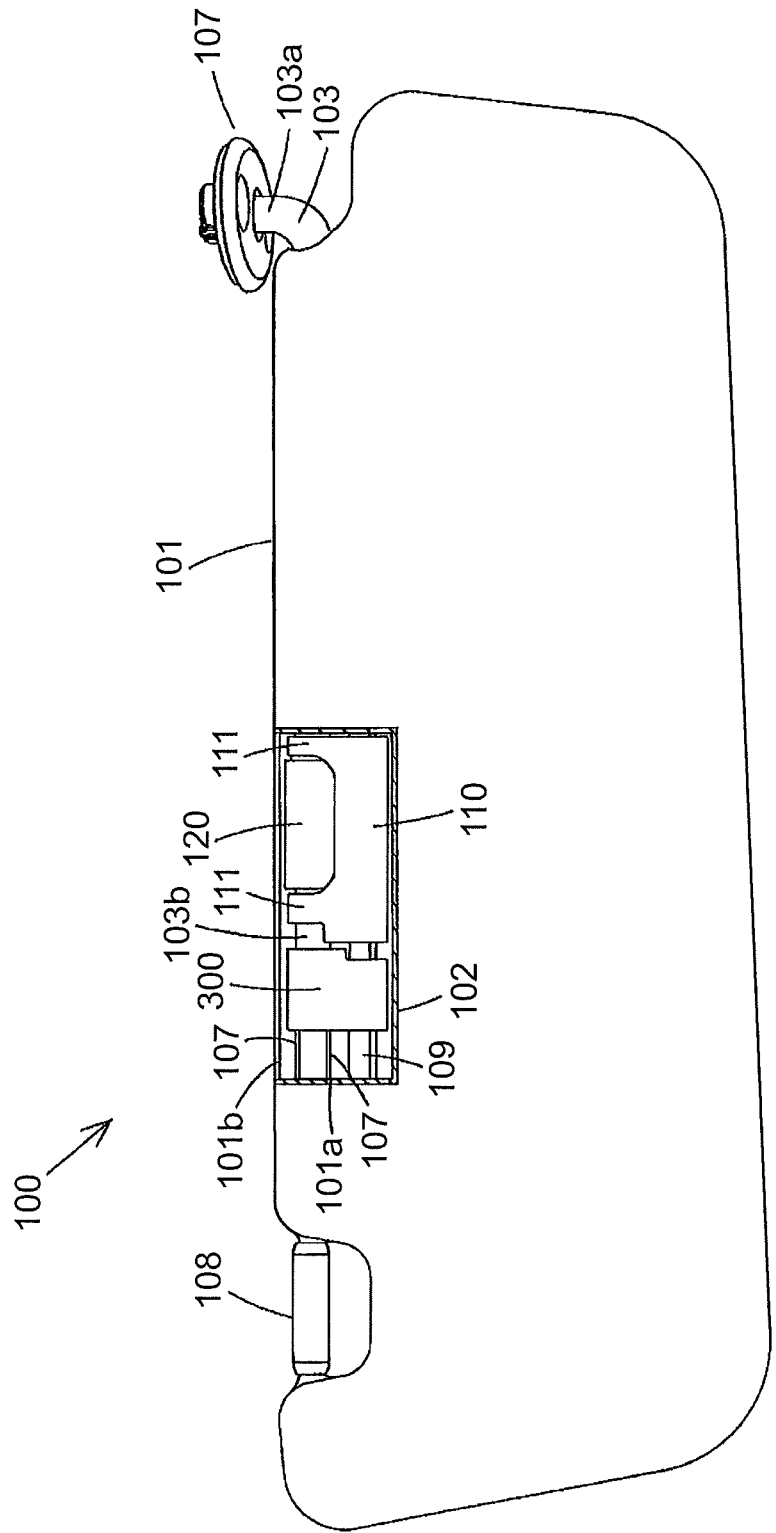
FIG. 8 is a partially broken front view of a vehicle sun visor according a second embodiment of the invention.

Next, a vehicle sun visor according to a second embodiment of the invention will be described. The vehicle sun visor according to the second embodiment differs from the vehicle sun visor according to the first embodiment in that the sun visor body is movable in the longitudinal direction of the horizontal shaft portion of the support shaft. FIG. 8 illustrates a partially broken front view of the vehicle sun visor 100 according to the embodiment. The sun visor body 101 used in the embodiment includes a guide rail 109 that extends in the longitudinal direction of the horizontal shaft portion 103b so that the sun visor body 101 moves in the longitudinal direction of the horizontal shaft portion 103b of the support shaft 103. The sun visor body 101 also includes a damper mechanism 300. The guide rail 109 is formed such that a cross section thereof that crosses the longitudinal direction has an L shape.

The bearing member 110 has two through holes in an up-down direction. The horizontal shaft portion 103b is rotatably inserted through the upper through hole. The guide rail 109 is slidably inserted through the lower through hole. The guide rail 109 is fixed to the sun visor body 101. When a force in the longitudinal direction of the horizontal shaft portion 103b is applied to the sun visor body 101, the sun visor body 101 slides in a longitudinal direction of the guide rail 109 with respect to the bearing member 110 and the damper mechanism 300 that are fixed to the horizontal shaft portion 103b. When a force directed around the longitudinal axis of the horizontal shaft portion 103b is applied to the sun visor body 101, the sun visor body 101 rotates together with the guide rail 109, the bearing member 110, and the damper mechanism 300 about the longitudinal axis of the horizontal shaft portion 103b.

Figure 9:
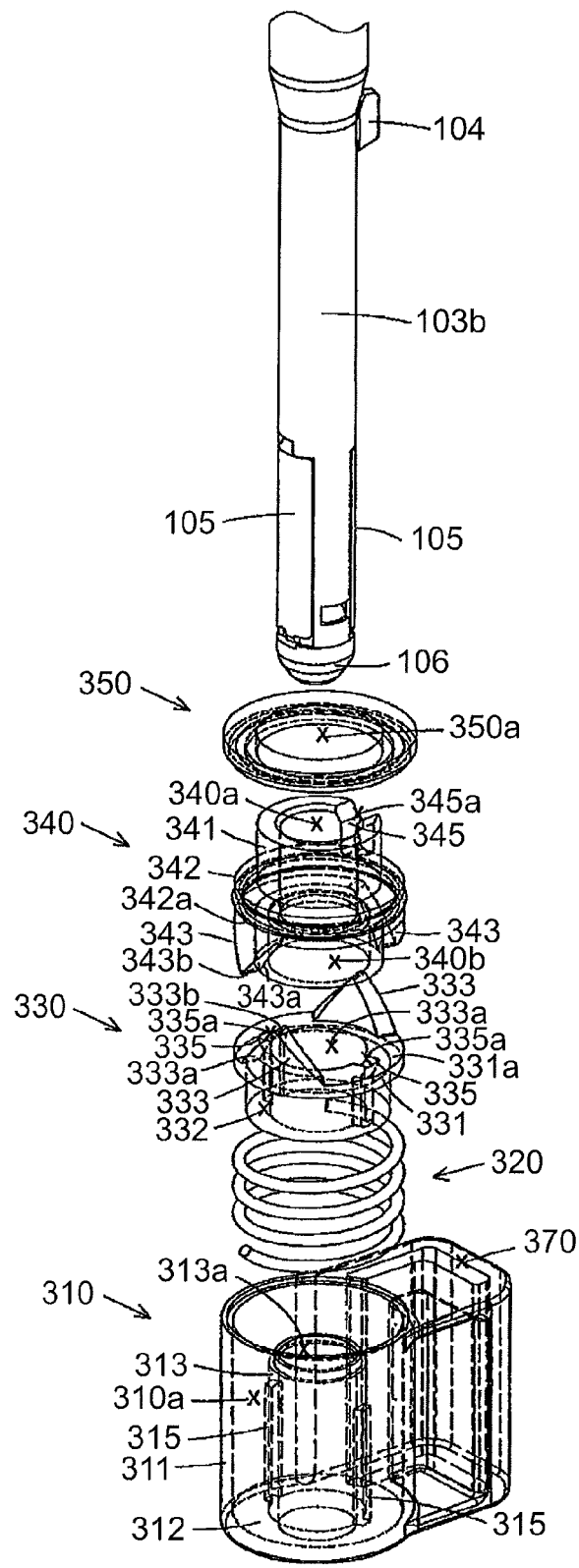
FIG. 9 is an exploded perspective view of a damper mechanism used in the vehicle sun visor according to the second embodiment of the invention.
Figure 10:
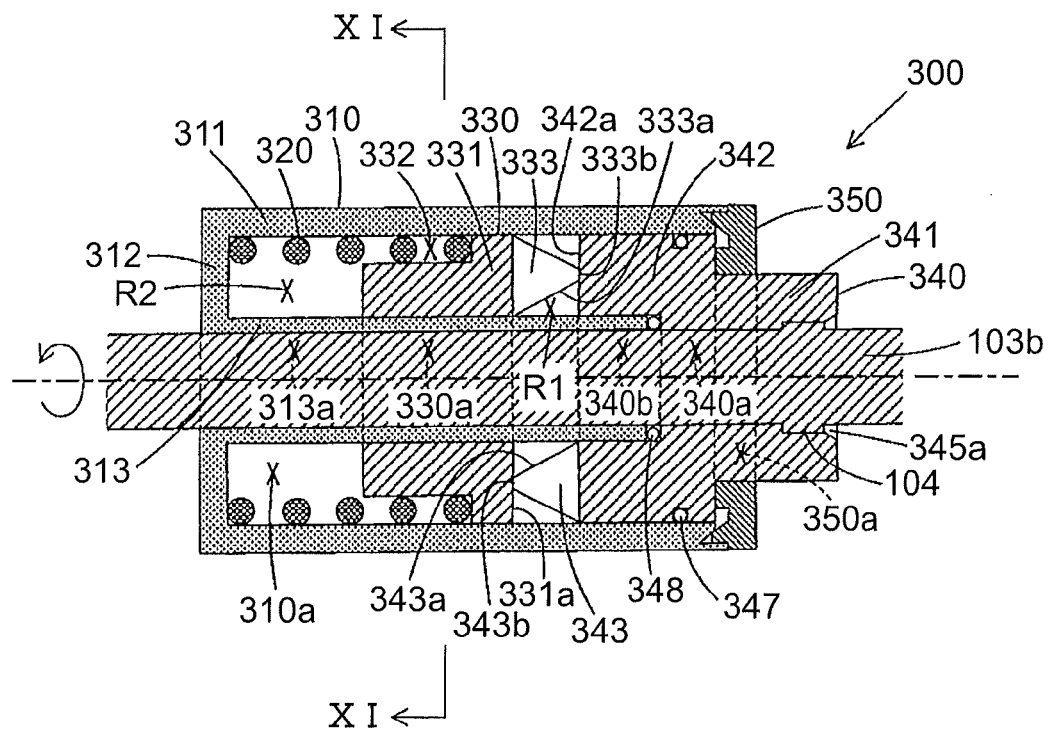
FIG. 10 is a schematic sectional view of the damper mechanism used in the vehicle sun visor according to the second embodiment of the invention, taken along an axial direction.

The configuration of the damper mechanism 300 will be described with reference to FIG. 9 to FIG. 11. FIG. 9 is an exploded perspective view of the damper mechanism 300. FIG. 9 shows a housing 310, a coil spring 320, a piston 330, a piston operating member 340, and a lid member 350 that constitute the damper mechanism 300. FIG. 9 also shows the horizontal shaft portion 103b that is joined to the damper mechanism 300. FIG. 10 is a schematic sectional view of the damper mechanism 300 taken along an axial direction. FIG. 10 shows the damper mechanism 300 in which the coil spring 320, the piston 330, and the piston operating member 340 are disposed in a space portion 310a of the housing 310, the lid member 350 is welded to the housing 310, and the horizontal shaft portion 103b is joined to the piston operating member 340.

Figure 11:
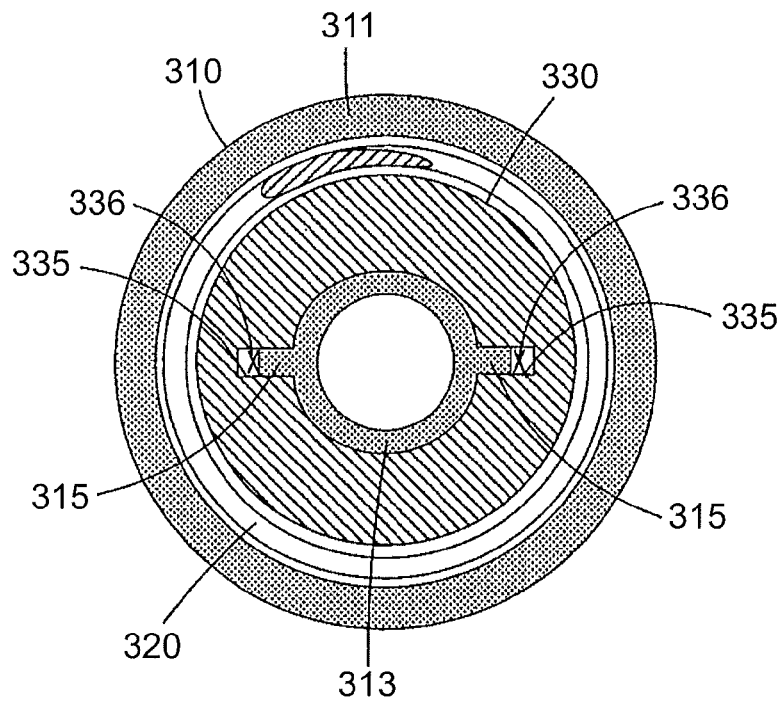
FIG. 11 is a sectional view taken along a line XI-XI in FIG. 10, and seen along arrows in FIG. 10.

FIG. 11 is a sectional view taken along a line XI-XI in FIG. 10 and seen along arrows in FIG. 10. FIG. 11 shows a state in which the piston 330 is disposed in the space portion 310a of the housing 310 and each of communication passages 336 is formed by a projected portion 315 that is formed in an outer peripheral surface of an inner wall portion 313 of the housing 310 and a groove 335a that is formed in an inner peripheral surface of the piston 330.

In the embodiment, the horizontal shaft portion 103b is provided with the rotation prevention projection 104, a contact point 105, and a cap 106. The horizontal shaft portion 103b extends through the damper mechanism 300. The contact point 105 provided in the horizontal shaft portion 103b is used as an electric power supply member that supplies electric power from a vehicle body-side to the sun visor body 101. More specifically, when the sun visor body 101 rotates about the longitudinal axis of the horizontal shaft portion 103b from the stored position toward the use range, the contact point 105 provided in the horizontal shaft portion 103b contacts a contact point (not shown) provided in the sun visor body 101. Thus, the supply of electric power to the sun visor body 101 is started via the contact point 105 provided in the horizontal shaft portion 103b and the contact point provided in the sun visor body 101. For example, if a mirror that is rotatably provided in the sun visor body 101 rotates toward the use range in this state, a power supply switch is activated, and the electricity is conducted to a lamp provided in the sun visor body 101. The housing 310, the coil spring 320, the piston 330, and the lid member 350 are able to rotate together with the sun visor body 101 about the longitudinal axis of the horizontal shaft portion 103b. When the force in the longitudinal direction of the horizontal shaft portion 103b is applied to the sun visor body 101 in order to slide the sun visor body 101 in the longitudinal direction of the horizontal shaft portion 103b, the sun visor body 101 slides in the longitudinal direction of the guide rail 109 with respect to the bearing member 110 and the damper mechanism 300 that are fixed to the horizontal shaft portion 103b.

As shown in FIG. 9, the housing 310 includes a cylindrical outer wall portion 311, the cylindrical inner wall portion 313, and a donut-shaped bottom portion 312. The outer wall portion 311 and the inner wall portion 313 respectively extend in the longitudinal direction of the horizontal shaft portion 103b from an outer peripheral edge and an inner peripheral edge of the bottom portion 312. Thus, the cylindrical space portion 310a is formed by the outer wall portion 311, the bottom portion 312, and the inner wall portion 313 of the housing 310. The space portion 310a extends in the longitudinal direction of the horizontal shaft portion 103b, and the vertical shaft portion 103*a*-side of the space portion 310*a* is opened. A through hole 313*a* that extends in the longitudinal direction of the horizontal shaft portion 103*b* is formed in a center side of the housing 310 by the inner wall portion 313. The horizontal shaft portion 103*b* is rotatably inserted in the through hole 313*a*. Furthermore, in the outer peripheral surface of the inner wall portion 313, the projected portions 315 that extend in the longitudinal direction of the horizontal shaft portion 103*b* are formed at positions facing each other in the circumferential direction. Moreover, the housing 310 has a through hole 370 that has an L-shaped cross section and extends in the longitudinal direction of the horizontal shaft portion 103*b*. The guide rail 109 with an L-shaped cross section is slidably inserted in the through hole 370. Accordingly, when the sun visor body 101 slides in the longitudinal direction of the horizontal shaft portion 103*b*, the guide rail 109 that is fixed to the sun visor body 101 slides in an extending direction of the guide rail 109 with respect to the housing 310 of the damper mechanism 300.

The coil spring 320, the piston 330, and the piston operating member 340 are disposed in the stated order, in the space portion 310*a*. The piston 330 is disposed such that the piston 330 is able to move linearly in the longitudinal direction of the horizontal shaft portion 103*b* within the space portion 310*a*. The piston 330 includes a cylindrical body portion 331. An outer peripheral surface of the body portion 331 is formed to have the same shape as the shape of an inner peripheral surface of the outer wall portion 311 of the housing 310. A through hole 330*a* is formed in a center side of the body portion 331. An inner peripheral surface of the body portion 331, which forms the through hole 330*a*, has the same shape as the shape of the outer peripheral surface of the inner wall portion 313 of the housing 310. Accordingly, the piston 330 (the body portion 331) is able to move linearly within the space portion 310*a* of the housing 310. The body portion 331 is provided with a cut portion 332 provided along an outer periphery of the body portion 331, and the cut portion 332 extends in the longitudinal direction of the horizontal shaft portion 103*b*. The coil spring 320 is positioned and disposed between the bottom portion 312 of the housing 310 and the cut portion 332 of the body portion 331. Thus, an elastic force of the coil spring 320 acts as the force that moves the piston 330 toward the piston operating member 340.

In the inner peripheral surface of the body portion 331, the grooves 335*a* are formed by groove forming portions 335 at positions facing each other in the circumferential direction. Each of the grooves 335*a* is recessed from the inner peripheral surface of the body portion 331 toward the outer peripheral side along the radial direction, and extends in the longitudinal direction of the horizontal shaft portion 103*b*. Each of the projected portions 315 of the inner wall portion 313 of the housing 310 is inserted in the corresponding groove 335*a* of the body portion 331 of the piston 330. Accordingly, the linear movement of the piston 330 in the longitudinal direction of the horizontal shaft portion 103*b* is guided. Furthermore, the grooves 335*a* and the projected portions 315, which extend in the longitudinal direction of the horizontal shaft portion 103*b*, are fitted to each other. Thus, when the housing 310 rotates together with the sun visor body 101 about the longitudinal axis of the horizontal shaft portion 103*b*, the piston 330 also rotates together with the housing 310. As in the first embodiment, a length of each groove 335*a* of the piston 330 in the radial direction is set to be longer than a length of the projected portion 315 of the housing 310 in the radial direction such that the communication passage 336 that provides communication between the first space region R1 and the second space region R2 is formed in the groove 335*a*.

Furthermore, first cam members 333 that extend in the circumferential direction of the body portion 331 and are projected toward the piston operating member 340 are formed at two positions facing each other in the circumferential direction, in an end surface 331*a* of the body portion 331 of the piston 330 on a side that faces the piston operating member 340. Each of the first cam members 333 includes a contact portion 333*a* and a tip 333*b*.

The piston operating member 340 includes a cylindrical body portion 341. A flange portion 342 is formed in the piston 330-side of the body portion 341. An outer peripheral surface of the flange portion 342 is formed to have the same shape as the shape of the inner peripheral surface of the outer wall portion 311 of the housing 310. The piston operating member 340 has a through hole provided in the center side of the piston operating member 340, the through hole extending in the longitudinal direction of the horizontal shaft portion 103*b*. The through hole of the piston operating member 340 has a first through hole 340*a* that is formed on the vertical shaft portion 103*a*-side and a second through hole 340*b* that is formed on a side that faces the piston 330. A diameter of the second through hole 340*b* is set to be larger than a diameter of the first through hole 340*a*. The horizontal shaft portion 103*b* is rotatably inserted in the first through hole 340*a*. An inner peripheral surface of the piston operating member 340, which forms the second through hole 340*b*, is formed to have the same shape as the shape of the outer peripheral surface of the inner wall portion 313 of the housing 310. Furthermore, the body portion 341 is provided with a rotation prevention groove 345*a* that is fitted to the rotation prevention projection 104 provided in the horizontal shaft portion 103*b*. When the horizontal shaft portion 103*b* is inserted in the first through hole 340*a* and the through hole 313*a*, the rotation prevention projection 104 that is formed in the outer periphery of the horizontal shaft portion 103*b* is inserted in the rotation prevention groove 345*a* of the piston operating member 340. Thus, the rotation prevention projection 104 is fitted to the rotation prevention groove 345*a*, and thus the piston operating member 340 is joined to the horizontal shaft portion 103*b*. In other words, when the sun visor body 101 rotates about the longitudinal axis of the horizontal shaft portion 103*b*, the piston operating member 340 is maintained in a state in which the piston operating member 340 is joined to the horizontal shaft portion 103*b*, and thus the piston operating member 340 does not rotate.

Second cam members 343 that extend in the circumferential direction of the flange portion 342 and are projected toward the piston 330 are formed at two positions facing each other in the circumferential direction, in an end surface 342*a* of the flange portion 342 of the piston operating member 340 on a side that faces the piston 330. Each of the second cam members 343 includes a contact portion 343*a* and a tip 343*b*.

The space portion 310*a* of the housing 310 is sealed by the piston operating member 340. The fluid such as oil is filled in the sealed space portion 310*a*. The flange portion 342 of the piston operating member 340 is provided with an annular seal member 347 that prevents leakage of the fluid filled in the sealed space portion 310*a* via a gap between the outer wall portion 311 of the housing 310 and the piston operating member 340. An annular seal member 348 that prevents leakage of the fluid filled in the sealed space portion 310*a* via a gap between the inner wall portion 313 of the housing 310 and the piston operating member 340 is provided between the inner wall portion 313 of the housing 310 and the piston operating member 340.

The lid member 350 is provided with a circular through hole 350*a*. As in the first embodiment, the lid member 350 is fitted to the outer wall portion 311 of the housing 310 in a state in which the body portion 341 of the piston operating member 340 extends through the through hole 350a.

In the above embodiments, when the sun visor body is rotated to the stored position, the rotational movement of the sun visor body is damped by the damper mechanism only in the range where the rotational angle from the stored position is equal to or smaller than the damping angle (i.e., a damping range). Accordingly, during the rotational movement other than the rotational movement to the stored position for storage, the operability of the sun visor body is improved. Furthermore, a damping characteristic of the damper mechanism in the damping range can be set arbitrarily without degrading the operability of the sun visor body during the rotational movement other than the rotational movement to the stored position for storage. The rotational movement of the sun visor body is damped using the elastic force of the elastic member such as the coil spring and pressure of the fluid such as oil. Accordingly, it is possible to reduce a change in the damping characteristic due to a change in an external temperature. Furthermore, in each of the damper mechanisms 200, 300 in the first and second embodiments of the invention, the piston 230 or 330 moves linearly such that the fluid filled in the second space region R2 of the housing 210 or 310 flows through the communication passages 236 or 336, and thus, an amount of the moved fluid (oil) is large, as compared to a rotary damper that generates a damping force using the flow of a fluid such as oil through a gap between a rotor and an inner wall of a housing when the sun visor body is rotated to the stored position. Accordingly, in each of the damper mechanisms 200, 300 in the first and second embodiments of the invention in which the damping force is generated using viscous resistance caused when the fluid flows through the communication passages, the damping force can be easily controlled and a larger damping force can be obtained, as compared to the rotary damper. Moreover, the damping characteristic can be changed by changing an inclined angle of the contact portion 233a or 333a of the first cam member 233 or 333 and an inclined angle of the contact portion 243a or 343a of the second cam member 243 or 343. Further, the damping characteristic can be changed by adjusting the shape of the communication passage. Accordingly, the damping characteristic can be controlled with a high degree of freedom.

The invention is not limited to the configurations described in the embodiments, and modifications, additions, or deletions may be made to the configurations within the scope of the invention. The damping angle (the damping range) may be equal to or smaller than the storing angle (the storing range). However, the damping angle may be larger than the storing angle. A method of joining the piston operating member to the support shaft (the horizontal shaft portion) is not limited to the methods described in the embodiments. The shapes of the piston and the piston operating member are not limited to the shapes described in the embodiments. As the elastic member that generates the elastic force for pressing the piston, any of various elastic members other than the coil spring may be used. For example, the plate spring that is bent in an S shape or a Z shape may be used. The shapes of the first cam member and the second cam member, which are respectively provided in the piston and the piston operating member, are not limited to the shapes described in the embodiments. For example, one of the cam members may include the inclined surface while the other cam member may include the projection. At least one cam member needs to be provided in each of the piston and the piston operating member. As the second operation element that converts the rotational movement of the first operation element into the linear movement, it is possible to use any of various constituent elements other than the elements described in the embodiments, each of which includes the first cam member provided in the piston (a first member) that rotates in conjunction with the sun visor body, and the second cam member provided in the piston operating member (a second member) joined to the support shaft (the horizontal shaft portion). In each of the embodiments, the sealed space portion is formed by the housing and the piston operating member. However, a method for forming the sealed space portion is not limited to this. In each of the embodiments, the piston is able to move within the sealed space portion. However, the sealed space portion may move. As the fluid filled in the sealed space portion, various types of fluids other than oil may be used. The communication passage, which provides communication between the first space region and the second space region separated by the piston, is not limited to the communication passages described in the embodiments. For example, a through hole that extends through the piston in the axial direction may be used as the communication passage. At least one communication passage may be provided. As a guide mechanism that guides the linear movement of the piston, it is possible to use any of the guide mechanisms with various configurations other than the guide mechanism that is described in the embodiments and formed by the groove and the projected portion. Alternatively, the guide mechanism may be omitted. As a mechanism that rotates the piston together with the sun visor body, it is possible to use any of the mechanisms with various configurations other than the mechanism described in the embodiment, which is formed by the groove provided in the housing and the projected portion provided in the piston, and the mechanism described in the embodiment, which is formed by the groove provided in the piston and the projected portion provided in the housing. Either the configuration in which the horizontal shaft portion of the support shaft does not extend through the damper mechanism or the configuration in which the horizontal shaft portion of the support shaft extends through the damper mechanism may be used. The configuration in which the sun visor body slides in the longitudinal direction of the horizontal shaft portion of the support shaft and the configuration in which the contact point is provided in the support shaft may be appropriately selected to be used. Alternatively, these configurations may be omitted. In the embodiments, the lid member and the piston operating member are disposed on a support shaft insertion side where the support shaft is inserted (i.e., the vertical shaft portion 103a-side) with respect to the housing, and the piston moves to the side opposite to the support shaft insertion side (i.e., the side opposite to the vertical shaft portion 103a) when the sun visor body is stored. However, the positions at which the lid member, the piston operating member, and the piston are disposed with respect to the housing can be appropriately changed. For example, the lid member and the piston operating member may be disposed on the side opposite to the support shaft insertion side (i.e., the side opposite to the vertical shaft portion 103a) with respect to the housing, and the piston may move to the support shaft insertion side (the vertical shaft portion 103a-side) when the sun visor body is stored. In the embodiments, the first half-split body and the second half-split body are used as the constituent members of the body, and the damper mechanism is disposed in the internal space that is formed by joining the first half-split body and the second half-split body to face each other. However, as the constituent members of the body, other constituent member(s) may be used. For example, a core material in which expanded polypropylene (EPP) are filled and shaped may be used as the constituent member of the body, and the damper mechanism may be provided in the core material. In the embodiments, the lid member is welded to the housing. However, as the method for fitting the lid member to the housing, various methods may be used. For example, a method for screwing the lid member to the housing using a screw or the like may be used. Each of the constituent members described in the embodiments may be used independently, and any of the plural constituent members that are appropriately selected may be used in combination.

The invention may also be configured as follow. The second operation element may include the first cam member and the second cam member that operate in conjunction with each other. With this configuration, the second operation element can be configured easily. The damper piston may be rotatable together with the sun visor body such that the damper piston serves as both of the first operation element and the third operation element. With this configuration, the first operation element and the second operation element can be configured easily. The damper may include a fluid for damping, a housing that includes a space portion in which the fluid for damping is housed in a sealed manner, and a damper piston that is disposed in the space portion and presses the fluid for damping, and the housing may be integrated with the third operation element in the damper operating portion. The damper may include a fluid for damping, a housing that includes a space portion in which the fluid for damping is housed in a sealed manner, and a damper piston that is disposed in the space portion and presses the fluid for damping, and the damper piston may be integrated with the third operation element in the damper operating portion. With this configuration, the damper can be configured easily.

What is claimed is:

1. A vehicle sun visor comprising:
a support shaft fitted to a ceiling surface of a vehicle cabin;
a sun visor body that is fitted to the support shaft and that is configured to be rotatable about a longitudinal axis of the support shaft between a stored position and a use range;
an urging member that applies an urging force to the sun visor body;
a damper that applies a damping force to rotational movement of the sun visor body when the sun visor body rotates to the stored position; and
a damper operating portion that operates the damper, wherein:
the damper operating portion includes a first operation element that rotates in conjunction with the sun visor body; a second operation element that converts rotational movement of the first operation element to linear movement; and a third operation element that is moved linearly via the second operation element; and
the damper is configured to be operated by linear movement of the third operation element in a prescribed range set between the use range and the stored position, when the sun visor body rotates to the stored position.

2. The vehicle sun visor according to claim 1, wherein the second operation element includes a first cam member and a second cam member that operate in conjunction with each other.

3. The vehicle sun visor according to claim 2, wherein:
each of the first cam member and the second cam member has a contact portion;
when the sun visor body rotates to the stored position, the third operation element receives a pressing force and moves linearly due to contact between the contact portion of the first cam member and the contact portion of the second cam member in the prescribed range; and
when the sun visor body rotates from the stored position toward the use range, the third operation element does not receive the pressing force in the prescribed range.

4. The vehicle sun visor according to claim 1, wherein:
the damper includes a fluid for damping, a housing that has a space portion in which the fluid for damping is housed in a sealed manner, and a damper piston that is disposed in the space portion and presses the fluid for damping; and
the damper piston operates as the third operation element in the damper operating portion.

5. The vehicle sun visor according to claim 4, wherein:
the damper piston divides the space portion into a plurality of space regions; and
a communication passage, which provides communication among the plurality of space regions, is provided to allow the fluid for damping to flow in the plurality of space regions.

6. The vehicle sun visor according to claim 4, wherein the damper operating portion further includes an elastic member that applies an elastic force in a returning direction to the damper piston that operates as the third operation element.

7. The vehicle sun visor according to claim 6, wherein the damper piston is rotatable together with the sun visor body so as to operate as both of the first operation element and the third operation element.

8. The vehicle sun visor according to claim 7, wherein:
the damper further includes a piston operating member joined to the support shaft;
the second operation element includes a first cam member and a second cam member that operate in conjunction with each other; and
the first cam member is provided in the damper piston, and the second cam member is provided in the piston operating member.

9. The vehicle sun visor according to claim 8, wherein:
each of the first cam member and the second cam member has a contact portion;
when the sun visor body rotates to the stored position, the damper piston receives a pressing force against the elastic force of the elastic member and moves linearly due to contact between the contact portion of the first cam member and the contact portion of the second cam member in the prescribed range; and
when the sun visor body rotates from the stored position toward the use range, the damper piston does not receive the pressing force against the elastic force of the elastic member in the prescribed range.

10. The vehicle sun visor according to claim 5, wherein the communication passage is provided in the damper piston, or between the damper piston and the housing.

11. The vehicle sun visor according to claim 10, wherein the plurality of space regions includes a first space region and a second space region, and the damper piston is configured to move in an axel direction of the support shaft, the first space region has a first volume, the second space region has a second volume, one of the first volume and the second volume increases and the other of the first volume and the second volume decreases when the damper piston moves along the axel direction, causing the fluid to flow from one of the first region and the second region to the other of the first region and the second region via the communication passage.

* * * * *